(12) United States Patent
Dudt et al.

(10) Patent No.: US 7,794,808 B2
(45) Date of Patent: Sep. 14, 2010

(54) ELASTOMERIC DAMAGE-CONTROL BARRIER

(75) Inventors: Philip John Dudt, Rockville, MD (US); Roshdy George S. Barsoum, McLean, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 379 days.

(21) Appl. No.: 11/443,845

(22) Filed: May 22, 2006

(65) Prior Publication Data

US 2007/0093158 A1    Apr. 26, 2007

Related U.S. Application Data

(63) Continuation-in-part of application No. 10/864,317, filed on Jun. 10, 2004, now Pat. No. 7,300,893.

(60) Provisional application No. 60/564,584, filed on Apr. 23, 2004.

(51) Int. Cl.
    *B65D 39/00*      (2006.01)
    *B32B 27/04*      (2006.01)
    *F41H 5/04*      (2006.01)
    *F41H 5/06*      (2006.01)

(52) U.S. Cl. ..................... 428/36.9; 428/35.7; 428/36.8; 428/911; 428/912; 442/134; 442/135; 89/36.02; 89/36.04

(58) Field of Classification Search ............... 89/36.02, 89/36.04; 114/74 A, 356, 357, 69; 138/137, 138/109, 125, 138, DIG. 1, 140–153, 172–178, 138/110; 156/212, 244.13, 331.4, 196, 224, 156/309.3, 334, 393, 84, 85, 86, 91; 174/73.1, 174/DIG. 8; 188/22.5; 220/560.02, 560.04, 220/62.19, 900; 248/560, 628; 249/155, 249/161; 252/182.23; 264/171.12, 171.24, 264/171.27, 219, 230, 46.5; 267/81, 140.4, 267/141.2, 148, 152, 154, 160; 285/424, 285/45, 55, 915, 921; 324/338, 342; 343/872, 343/719, 873; 428/339, 423.1, 625, 109, 428/113, 215, 292.1, 297.4, 308.4, 309.9, 428/319.1, 34.9, 357, 36.2, 421, 422, 423.3, 428/425.8, 457, 458, 521, 594, 596, 911, 428/912, 913; 442/59, 134, 135, 180, 250, 442/260, 327; 464/85, 102; 473/520, 524, 473/300, 568; 528/49, 61, 63, 64, 67; 52/782.1; 405/157, 154.1
See application file for complete search history.

(56) References Cited

U.S. PATENT DOCUMENTS

| | | | |
|---|---|---|---|
| 3,731,710 A * | 5/1973 | Bauer et al. | 138/143 |
| 3,944,271 A * | 3/1976 | Eggert, Jr. | 293/122 |
| 4,132,382 A * | 1/1979 | Jackson | 251/5 |
| 4,207,364 A * | 6/1980 | Nyberg | 138/141 |
| 4,216,803 A * | 8/1980 | Hall | 138/144 |
| 4,840,201 A * | 6/1989 | Botsolas | 138/178 |
| 4,909,669 A * | 3/1990 | Baker | 405/168.1 |
| 5,203,435 A * | 4/1993 | Dolgin | 188/322.5 |
| 5,212,495 A * | 5/1993 | Winkel et al. | 343/872 |
| 5,490,742 A * | 2/1996 | Cronk | 405/157 |
| 5,595,540 A * | 1/1997 | Rivin | 464/85 |
| 5,635,562 A | 6/1997 | Malcolm | |
| 5,705,764 A | 1/1998 | Schade et al. | |
| 5,778,813 A * | 7/1998 | Kennedy | 114/74 A |
| 5,789,327 A | 8/1998 | Rousseau | |

| | | | |
|---|---|---|---|
| 5,792,974 A | | 8/1998 | Daqis et al. |
| 6,009,789 A | | 1/2000 | Lyons |
| 6,114,488 A | * | 9/2000 | Kulp et al. ............... 528/49 |
| 6,213,540 B1 | | 4/2001 | Tusim et al. |
| 6,228,933 B1 | | 5/2001 | Hiles |
| 6,253,655 B1 | | 7/2001 | Lyons et al. |
| 6,298,963 B1 | | 10/2001 | Kim |
| 6,332,390 B1 | | 12/2001 | Lyons |
| 6,386,131 B1 | | 5/2002 | Barsoum |
| 6,420,509 B1 | * | 7/2002 | Putnam et al. ............ 528/61 |
| 6,510,777 B2 | | 1/2003 | Neal |
| 6,532,857 B1 | * | 3/2003 | Shih et al. .............. 89/36.02 |
| 6,601,497 B2 | | 8/2003 | Ghiorse et al. |
| 6,642,159 B1 | * | 11/2003 | Bhatnagar et al. ........ 442/134 |
| 6,706,406 B1 | * | 3/2004 | Kennedy ............. 428/423.1 |
| 6,792,843 B2 | | 9/2004 | Mohr et al. |
| 6,860,186 B2 | | 3/2005 | Cohen |
| 6,984,452 B2 | * | 1/2006 | Kennedy ............. 428/423.1 |
| 7,067,031 B2 | | 6/2006 | deWitt |
| 7,114,764 B1 | | 10/2006 | Barsoum et al. |
| 7,216,576 B2 | * | 5/2007 | Henry et al. ............ 89/36.02 |
| 7,261,945 B2 | | 8/2007 | Biermann et al. |
| 7,300,893 B2 | | 11/2007 | Barsoum et al. |
| 7,383,762 B2 | | 6/2008 | Cohen |
| 7,413,809 B2 | | 6/2008 | Biermann et al. |
| 2002/0178900 A1 | * | 12/2002 | Ghiorse et al. ........... 89/36.02 |
| 2003/0178084 A1 | * | 9/2003 | Charron ..................... 138/137 |
| 2005/0238967 A1 | * | 10/2005 | Rogers et al. ............... 430/5 |
| 2007/0093158 A1 | | 4/2007 | Dudt et al. |
| 2007/0111621 A1 | | 5/2007 | Barsoum et al. |
| 2008/0011381 A1 | * | 1/2008 | Squires ..................... 138/149 |

FOREIGN PATENT DOCUMENTS

WO    WO 2004092495 A2 * 10/2004

OTHER PUBLICATIONS

Sardanopoli, Armando. Thermoplastic Polyurethanes (TPUR). Engineered Materials Handbook. vol. 2, Engineering Plastics. Metals Park, OH: ASM International, 1988. pp. 203-208.*
Polyshield Hi-E Datasheet. (2002) 2 Pages.*
U.S. Appl. No. 12/287,161, filed Oct. 6, 2008, invention entitled "Pressureless Sintering-Based Method for Making a Two-Phase Ceramic Composite Body," inventors Curtis A. Martin, James A. Zaykoski, and Inna G. Talmy.
U.S. Appl. No. 12/286,285, filed Sep. 26, 2008, invention entitled "Lightweight Ballistic Armor Including Non-Ceramic-Infiltrated Reaction-Bonded-Ceramic Composite Material," inventor Curtis A. Martin.
U.S. Appl. No. 12/220,396, filed Jun. 25, 2008, invention entitled "Electrical and Elastomeric Disruption of High-Velocity Projectiles," inventors Clinton S. Winchester, Phillip J. Dudt, and Hampton M. DeJarnette.
U.S. Appl. No. 12/082,192, filed Mar. 27, 2008, invention entitled "Composite Armor Having a Layered Metallic Matrix and Dually Embedded Ceramic Elements," inventor William A. Ferrando.
U.S. Appl. No. 11/973,990, filed Oct. 5, 2007, entitled "Composite Ballistic Armor Having Geometric Ceramic Elements for Shock Wave Attenuation," joint inventors Curtis A. Martin, Gilbert F. Lee, and Jeffrey J. Fedderly.
U.S. Appl. No. 11/973,999, filed Oct. 5, 2007, entitled "Ballistic Armor Methodology Using Low-Density Ceramic Material," joint inventors Curtis A. Martin, David E. Johnson, David P. Owen, Rodney O. Peterson, and Philip J. Dudt.
Cohen, European Patent Application EP 1510776 A1, filed Aug. 23, 2004, published Mar. 2, 2005.
Weber et al., PCT (Patent Cooperation Treaty) Patent Application WO 2007/048370 A1, filed Sep. 8, 2006, published May 3, 2007.
Moore et al., PCT (Patent Cooperation Treaty) Patent Application WO 2008/097375 A2, filed Sep. 28, 2007, published Aug. 14, 2008.
Cohen (Mofet Etzion), European Patent Application EP 0942255 A1, filed Mar. 10, 1998, published Sep. 15, 1999.
Cohen (Mofet Etzion), European Patent Application EP 0843149 A1, filed Nov. 12, 1996, published May 20, 1998.
C.M. Roland and R. Casalini, "Effect of Hydrostatic Pressure on the Viscoelastic Response of Polyurea," *Polymer*, vol. 48, pp. 5747-5752, Elsevier Ltd., 2007 (available online Jul. 15, 2007).
R.B. Bogoslovov, C.M. Roland, and R.M. Gamache, "Impact-Induced Glass Transition in Elastomeric Coatings," *Applied Physics Letters*, vol. 90, pp. 221910-1-221910-3, American Institute of Physics, 2007 (published online May 31, 2007).
P.H. Mott, J.N. Twigg, D.F. Roland, H.S. Schrader, J.A. Pathak, and C.M. Roland, "High-Speed Tensile Test Instrument," *Review of Scientific Instruments*, vol. 78, pp. 045105-1-045105-6, American Institute of Physics, 2007 (published online Apr. 17, 2007).
C.M. Roland, J.N. Twigg, Y. Vu, and P.H Mott, "High Strain Rate Mechanical Behavior of Polyurea," *Polymer*, vol. 48, Elsevier Ltd., pp. 574-578, 2007 (available online Dec. 18, 2006).
A.V. Amirkhizi, J. Isaacs, J. McGee, and S. Nemat-Nasser, "An Experimentally-Based Viscoelastic Constitutive Model for Polyurea, Including Pressure and Temperature Effects," *Philosophical Magazine*, vol. 86, No. 36, pp. 5847-5866, Dec. 2006.
Jennifer Kramer, "Polyurea: Stronger Than a Speeding Bullet," *CoatingsPro*, May 2006, pp. 40-45.
Tong Jiao, Rodney J. Clifton, and Stephen E. Grunschel, "High Strain Rate Response of an Elastomer", *Shock Compression of Condensed Matter—2005*, M. D. Furnish, M. Elert, T. P. Russell, and C. T. White, Editors, American Institute of Physics, pp. 809-812, 2006.
S. Nemat-Nasser and A.V. Amirkhizi, "Finite Amplitude Shear Wave in Pre-Stressed Thin Elastomer," *Wave Motion*, vol. 43, pp. 20-28, Elsevier Ltd., 2005 (available online Jun. 17, 2005).
Keith Rogers, "'Elastomeric Technology': Company Developing New Armor," *Las Vegas Review-Journal*, Feb. 13, 2005 (4 pages printed out from reviewjournal.com, on Jan. 19, 2006).
P.E. Cros, L. Rota, C.E. Cottenot, R. Schirrer and C. Fond, "Experimental and Numberical Analysis of the Impact Behaviour of Polycarbonate and Polyurethane Multilayer," Eurodymat 2000, 6th International Conference on Mechanical and Physical Behaviour of Materials under Dynamic Loading, Cracow, Poland, Sep. 25-29, 2000, *Journal De Physique IV*, vol. 10, Issue 9, pp. Pr9-671 to Pr9-676, EDP Sciences, Les Ulis, France, 2000.

* cited by examiner

*Primary Examiner* — Jenna-Leigh Johnson
(74) *Attorney, Agent, or Firm* — Howard Kaiser

(57)              ABSTRACT

A typical inventive embodiment describes a tubular shape and comprises a rigid outer layer, an elastomeric middle layer and a rigid inner layer. The elastomeric material is a strain-rate-sensitive polymer (e.g., polyurethane or polyurea) having a Young's modulus of approximately 700-1000 psi at 100% strain, and strong strain-rate-sensitivity in approximately the $10^3$/second-$10^6$/second range. By the time that the projectile reaches the rigid inner layer, a projectile that impacts the three-layer system (commencing at the rigid outer layer) is structurally and kinetically diminished in its destructiveness by the rigid outer layer together with the elastomeric middle layer. Furthermore, the elastomeric middle layer becomes more rigid during a brief period in which it absorbs energy from the projectile, then again becomes elastic in a manner formative of a membrane covering the rigid inner layer. The elastomeric membrane tempers leakage if rupturing of the rigid inner layer has occurred.

20 Claims, 11 Drawing Sheets

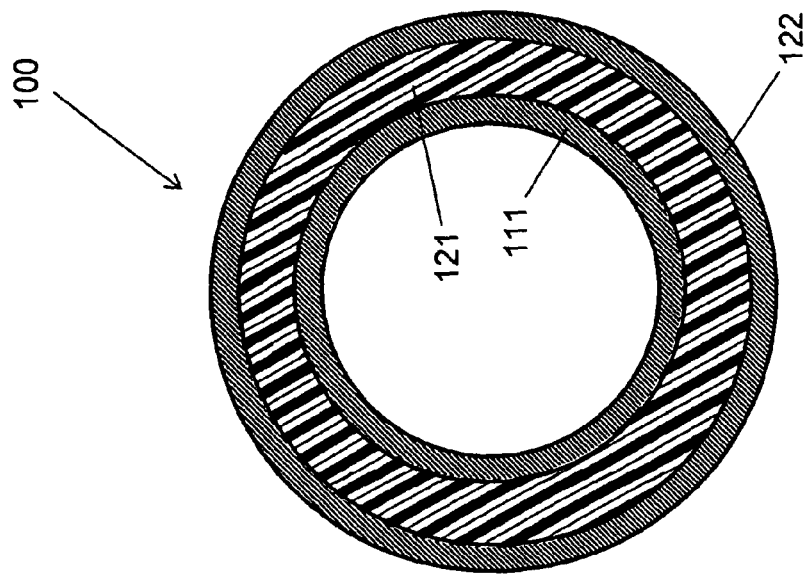
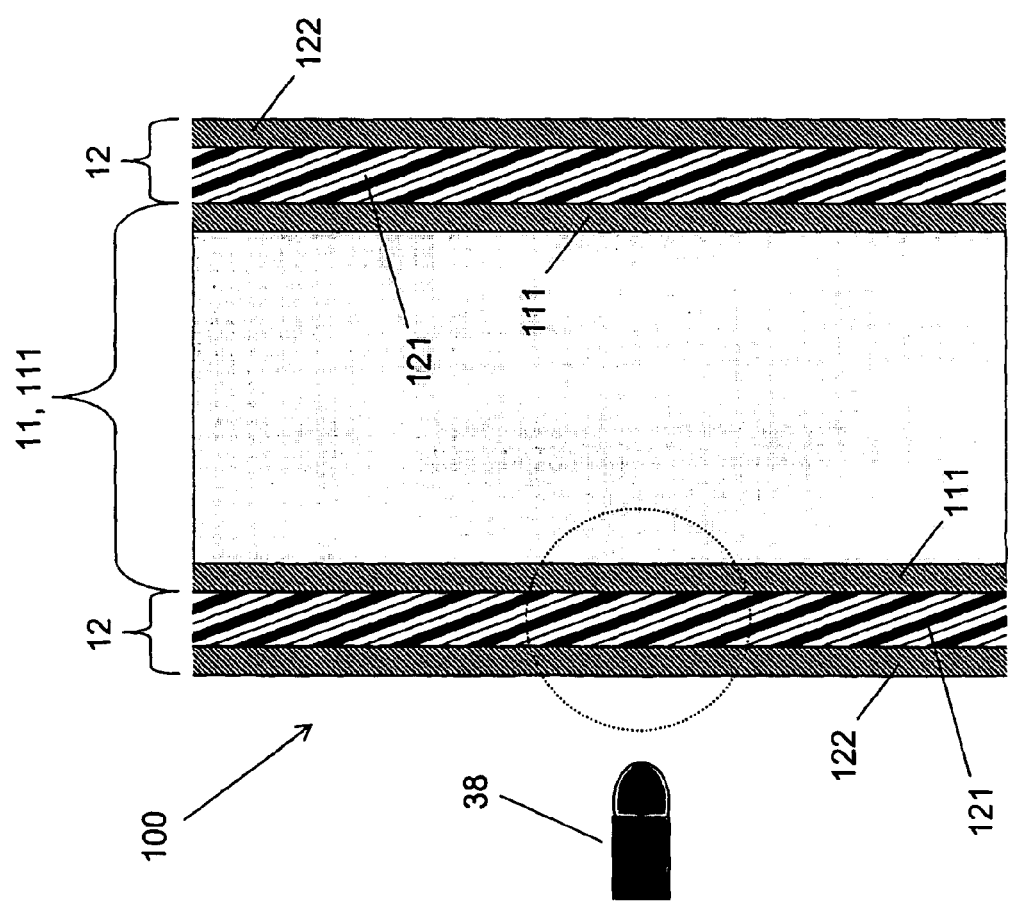

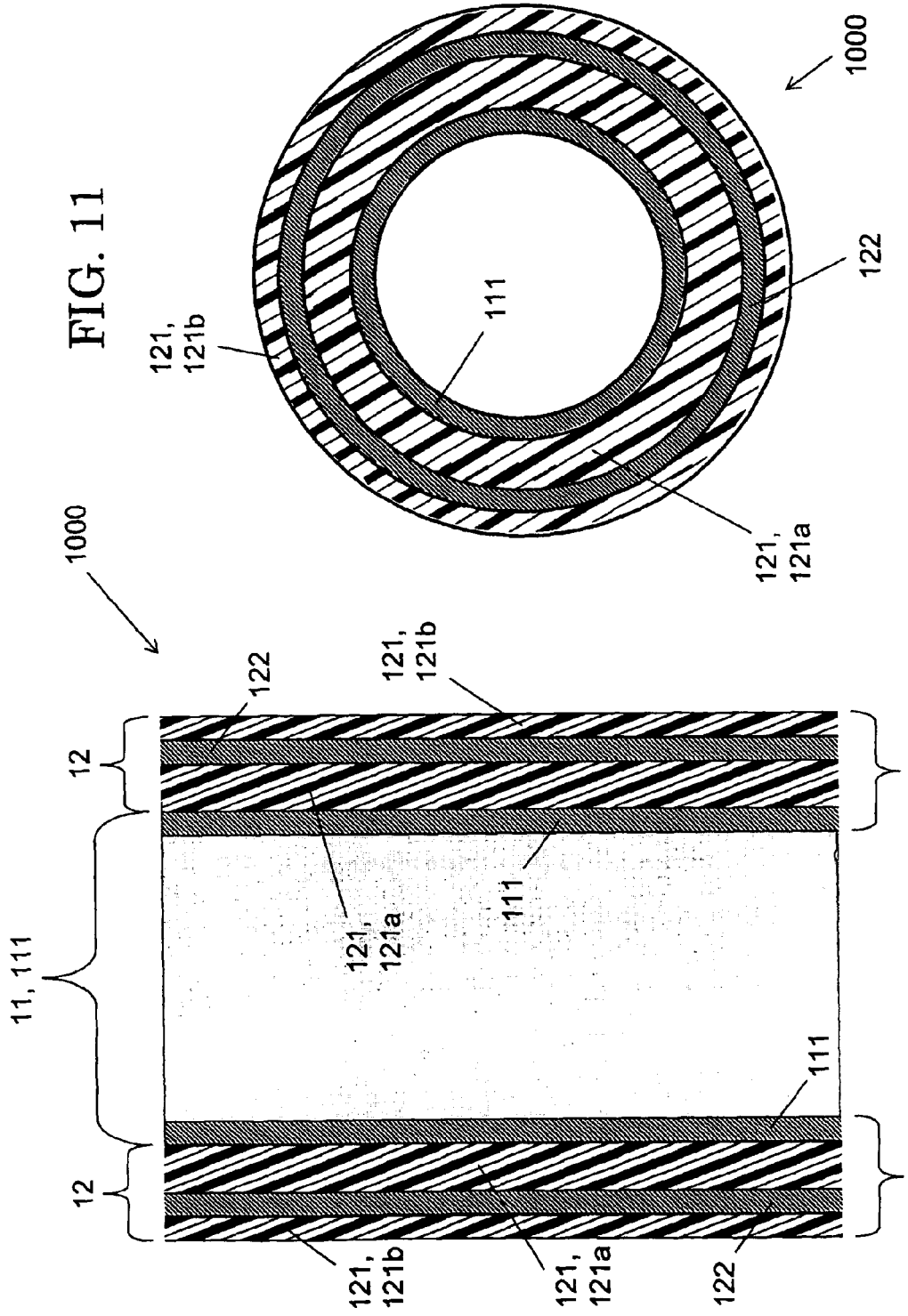

POLYUREA PROPERTIES

| | Plasite Semstone 403 | Air Products Versalink 1000 | SPI Polyshield Hi-E |
|---|---|---|---|
| Tensile Strength | 2300 psi | 8000 psi | 2500 psi |
| Elongation | 400 % | 460 % | 720 % |
| Hardness Shore A | - | 95 | 81 |
| Hardness Shore D | 46 | - | 39 |
| 100 % Modulus | - | 1000 psi | 780 psi |
| 300 % Modulus | - | 1400 psi | 1240 psi |

FIG. 12

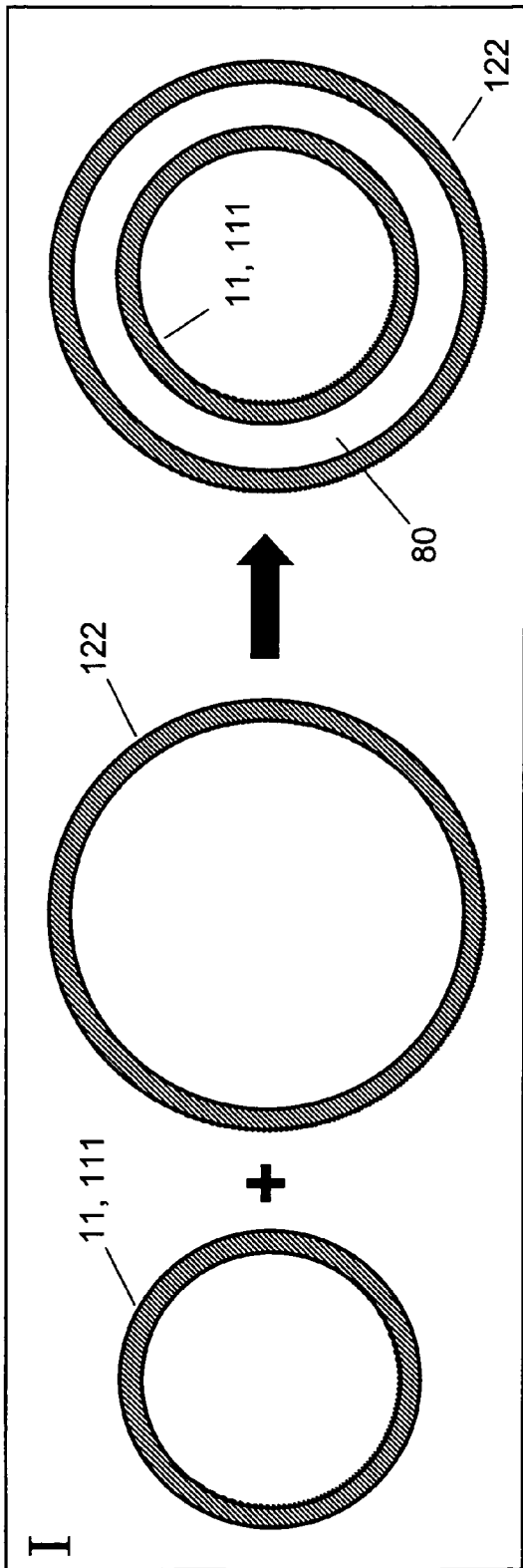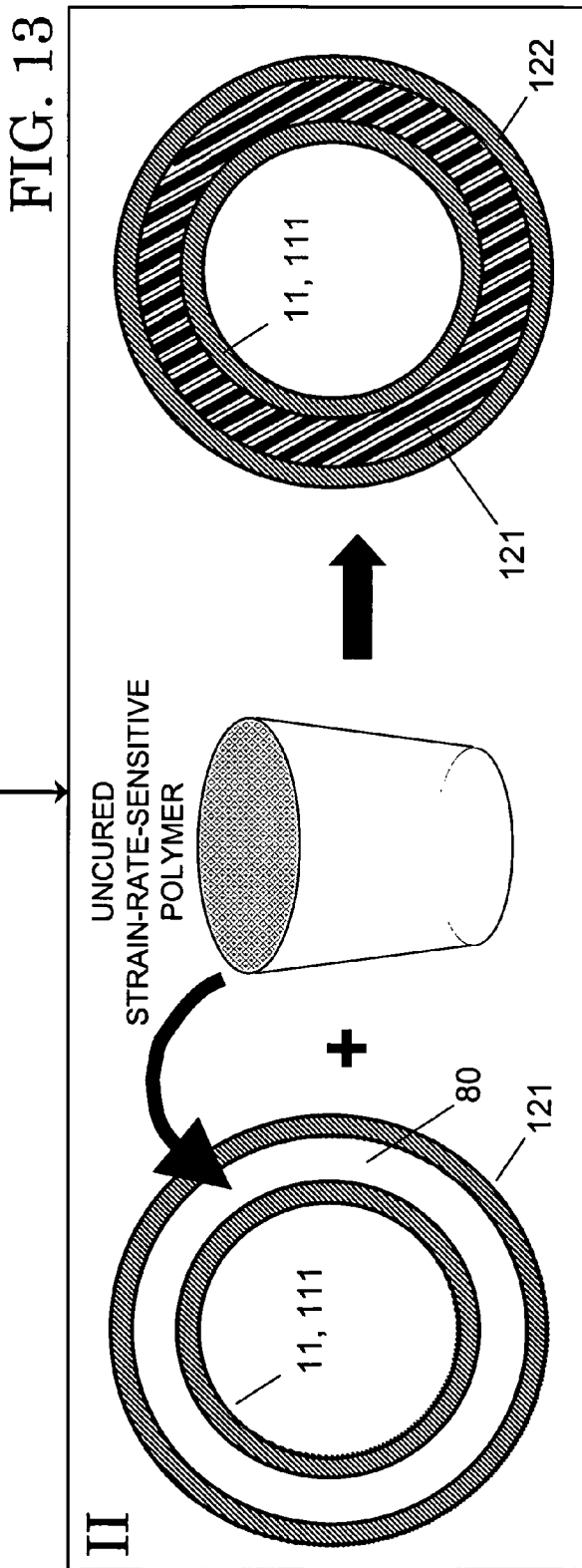
FIG. 13

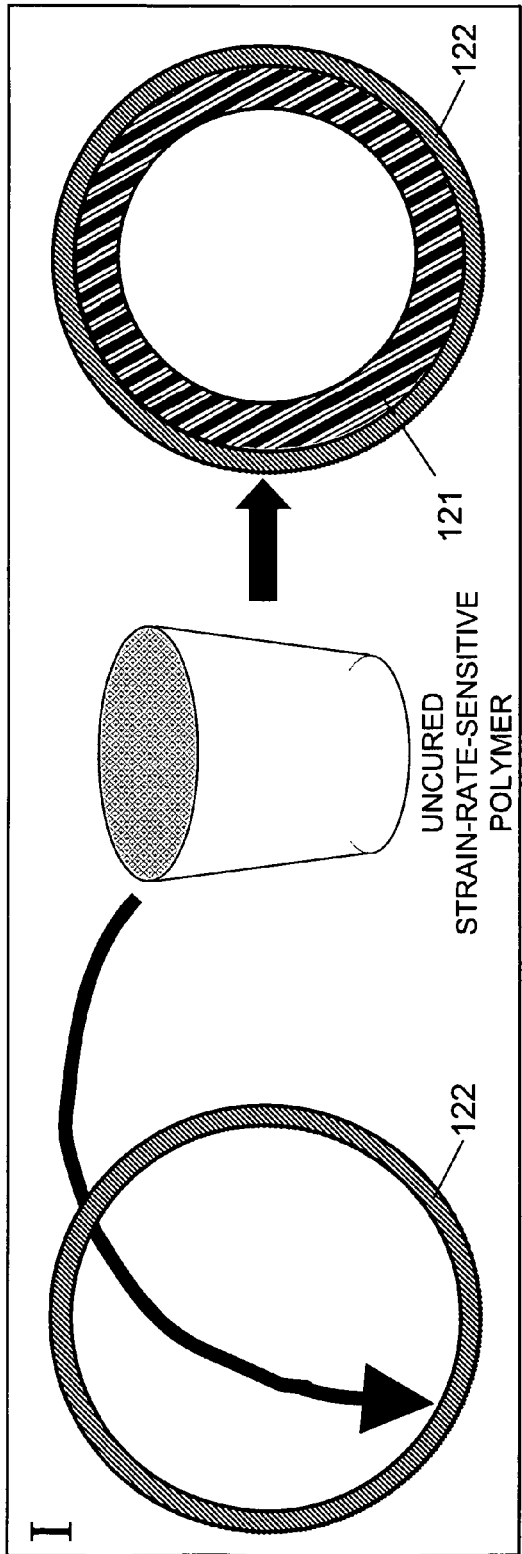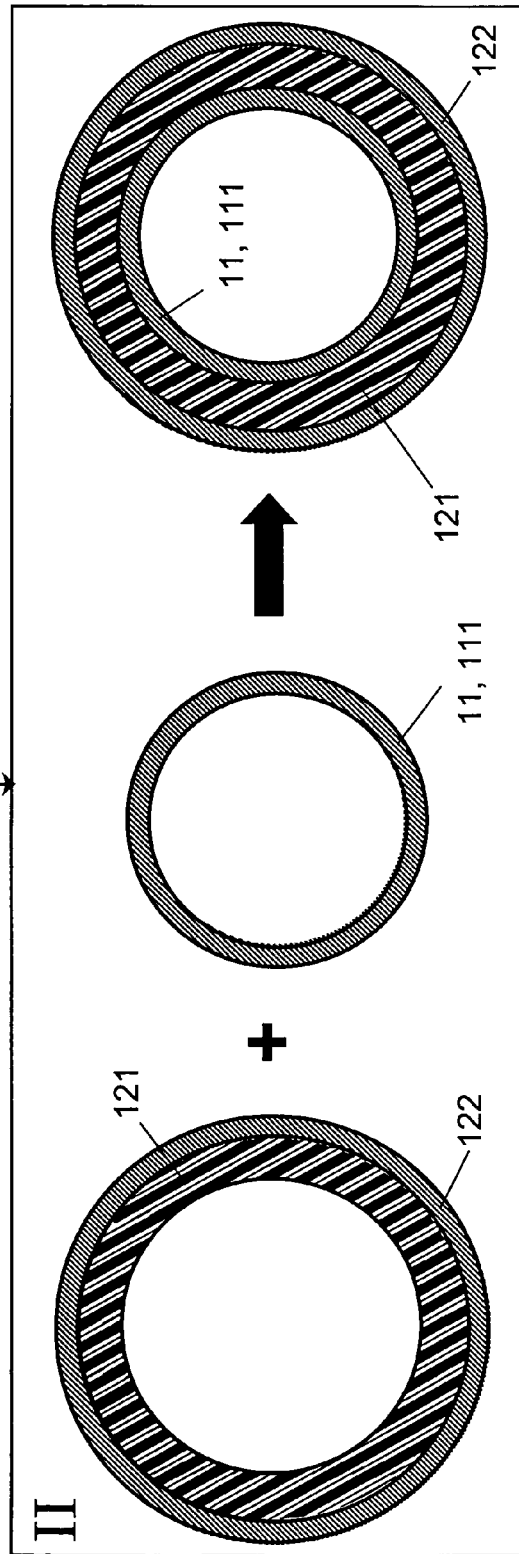
FIG. 15

ELASTOMERIC DAMAGE-CONTROL BARRIER

CROSS-REFERENCE TO RELATED APPLICATIONS

This application claims the benefit of U.S. provisional application No. 60/564,584, filed 23 Apr. 2004, hereby incorporated herein by reference, entitled "Armor Including a Strain Rate Hardening Elastomer," joint inventors Roshdy George S. Barsoum and Philip Dudt.

This application is a continuation-in-part of U.S. nonprovisional application no. 10/864,317, filed 10 Jun. 2004, hereby incorporated herein by reference, entitled "Armor Including a Strain Rate Hardening Elastomer," joint inventors Roshdy George S. Barsoum and Philip Dudt, now U.S. Pat. No. 7,300,893 B2, issue date 27 Nov. 2007, which claims the benefit of the aforesaid U.S. provisional application No. 60/564,584, filed 23 Apr. 2004, entitled "Armor Including a Strain Rate Hardening Elastomer," joint inventors Roshdy George S. Barsoum and Philip Dudt.

This application claims the benefit of PCT application (international application published under the Patent Cooperation Treaty) WO 2005/103363, filed 3 Nov. 2005, hereby incorporated herein by reference, entitled "Armor Including a Strain Rate Hardening Elastomer," joint inventors Roshdy George S. Barsoum and Philip Dudt, which claims the benefit of the aforesaid U.S. nonprovisional application Ser. No. 10/864,317, filed 10 Jun. 2004, entitled "Armor Including a Strain Rate Hardening Elastomer," joint inventors Roshdy George S. Barsoum and Philip Dudt, and which claims the benefit of the aforesaid U.S. provisional application No. 60/564,584, filed 23 Apr. 2004, entitled "Armor Including a Strain Rate Hardening Elastomer," joint inventors Roshdy George S. Barsoum and Philip Dudt.

STATEMENT OF GOVERNMENT INTEREST

The invention described herein may be manufactured and used by or for the Government of the United States of America for governmental purposes without payment of any royalties thereon or therefor.

BACKGROUND OF THE INVENTION

The present invention relates to protective coverings (such as armor) that may be used for people and objects, more particularly to methods and devices for protecting entities from damage or injury caused by explosive or ballistic events.

Surface ships, submarines, small boats, buoys, tanks, oil rigs, pipelines and nuclear storage are examples of water-borne and fluid-containing objects that are vulnerable to leakage, inward or outward, that may be caused by explosive or ballistic attack. For instance, an explosive or ballistic event can puncture or otherwise rupture a marine vessel in at least one location, resulting in the rapid ingress of water and the concomitant sinking of the marine vessel, thus posing a great risk to the occupants of the marine vessel. A liquid container or gas container (made of any structural material) that is leaking due to an explosive or ballistic event can represent a chemical leak hazard or a fire hazard (e.g., when the container is a tank containing gasoline).

It is therefore desirable to protect water-borne and fluid-containing objects from harm caused by explosions and projectiles. More specifically, the protection of such objects is sought so as to mitigate structural damage (such as manifested by one or more ruptures) and the consequent ingress or egress of fluid material.

SUMMARY OF THE INVENTION

In view of the foregoing, it is an object of the present invention to provide a methodology for reducing or minimizing the damage ensuing from an explosive and/or ballistic event to a water-borne or fluid-containing object.

It is a further object of the present invention to reduce or minimize the fluid ingress or fluid egress that is associated with such ensuing damage.

The present invention provides diverse embodiments of a multilayered (plural-layered) combination of materials comprising at least one "highly strain-rate-sensitive" (synonymously referred to herein as "strongly strain-rate-sensitive" or "highly rate-sensitive" or "strongly rate-sensitive") elastomeric material and at least one "rigid" (relatively more rigid) material. The rigid material, which is more rigid than the elastomeric material, can be any suitable structural material, including but not limited to a metal (wherein the term "metal" is broadly defined herein as any metallic material, e.g., an elemental metal or a metal alloy), a composite (e.g., a fiber-reinforced matrix composite), or a ceramic. The present invention's elastomer is typically a polymer such as a polyurethane or a polyurea, and is typically characterized by: a Young's modulus in the range of approximately 700 psi to approximately 1000 psi, at 100% strain; and, high (strong) strain-rate-sensitivity for strain rates in the range of approximately $10^3$/second to approximately $10^6$/second. Depending on the inventive embodiment, the inventive highly strain-rate-sensitive elastomer may also be characterized by high strain-rate-sensitivity outside of this $10^3$/sec-$10^6$/sec range of strain-rates. The term "range" is intended herein to be "inclusive," i.e., to include the delimiting (e.g., upper and lower) values of the range. The present invention's strain-rate-sensitive elastomer has the ability to practically immediately react to impact so as to rigidify while absorbing impact-related energy, and to then practically immediately return to its elastic (non-rigid) condition. As variously practiced, for instance, an inventive laminar configuration resists ballistic penetration in air, or resists rupture in a fluid medium, or averts or limits flooding following explosive damage to pipelines and ships.

The present invention's "high-strain-rate" ("highly rate-sensitive") polymers exhibit greatly increased transient mechanical property changes under rapid loading, such as when exposed to explosively generated forces, and exhibit high elongations during and after load removal. A typical highly rate-sensitive polymer used in inventive practice is a substance from the polyurea family or the polyurethane family, or is a mixture of substances from the polyurea and polyurethane families. Among its benefits, during a dynamic event a highly rate-sensitive polymer's propensity toward transient high-rate dynamic mechanical strength elevations enables it to share loads with the metal substrate to which it is bonded, thereby improving resistance to rupture. When some inventive embodiments are practiced under certain conditions, a highly rate-sensitive polymer is capable not only of affording improved structural (e.g., ballistic) performance in terms of precluding or limiting rupturing, but also of acting as a membrane to avoid flooding or to control the rate thereof in the event that there is at least one rupture.

In accordance with typical embodiments of the present invention, a laminar composite structure comprises three adjacent layers, viz., (i) a structural first layer, (ii) a strain-rate-sensitive elastomeric second layer, and (iii) a structural third layer. The strain-rate-sensitive elastomeric second layer is situated between the structural first layer and the structural third layer. The strain-rate-sensitive elastomeric second layer is characterized by: a Young's modulus in the range of approximately 700-1000 psi at 100% strain; and, a strain-rate-sensitivity hardening in the range of approximately $10^3$/second-$10^6$/second. The strain-rate-sensitive elastomeric second layer at least substantially consists of a polymer such as polyurethane and polyurea. The structural first layer and the structural third layer each at least substantially consist of a material such as metal, fiber-reinforced matrix composite and ceramic.

The laminar composite structure is characterized by resistance with respect to impact by a projectile that penetrates the structural first layer, wherein the projectile is mitigated upon traversing the structural first layer and the strain-rate-sensitive elastomeric second layer, and wherein the structural third layer is deformed but remains at least substantially intact upon impact by the projectile. The mitigation of the projectile includes blunting and/or breakage and/or slowing of the projectile. The deformation of the structural third layer includes denting and/or breakage of the structural third layer.

According to some inventive embodiments, the inventive laminar composite structure further comprises a fluid contained by the structural third layer, which has a tubular or other shape suitable for containment of fluid. The strain-rate-sensitive elastomeric second layer stiffens upon being traversed by the projectile. Moreover, the strain-rate-sensitive elastomeric second layer subsequently stretches so as to form a membrane that at least substantially covers the deformation (deformed portion) of the structural third layer. If the deformation of the structural third layer includes breakage, then the membrane reduces leakage of the fluid from the laminar composite structure.

The terms "tube," "tubular" and "pipe" are synonymously used herein to broadly denote any elongate hollow body, without any limitation in terms of geometry of the elongate hollow body. Hence, a "tube" or "pipe" can describe any shape. A "tube" or "pipe" can be cylindrical or non-cylindrical, rectilinear or curvilinear or curved; its cross-sectional profile can be regular or irregular, uniform or non-uniform along its length. A "tube" or "pipe" is usually implemented to contain, conduct or convey a fluid (e.g., a liquid, a gas or a solid particulate), but is not necessarily so implemented according to this definition.

Other objects, advantages and features of the present invention will become apparent from the following detailed description of the present invention when considered in conjunction with the accompanying drawings.

BRIEF DESCRIPTION OF THE DRAWINGS

The present invention will now be described, by way of example, with reference to the accompanying drawings, wherein:

FIG. 1 is an axially-longitudinally cross-sectional view of an embodiment of a cylindrical three-layer material system in accordance with the present invention.

FIG. 2 is a diametrically-transversely cross-sectional view of the inventive embodiment shown in FIG. 1.

FIG. 10 is an axially-longitudinally cross-sectional view, similar to the view of FIG. 1, of an embodiment of a four-layer material system in accordance with the present invention.

FIG. 11 is a diametrically-transversely cross-sectional view of the inventive embodiment shown in FIG. 10.

FIG. 12 is a table listing three different commercially available polyurea formulations and some of their material properties.

FIG. 13 is a schematic of a method for associating a protective barrier with a cylindrical vessel or conduit in accordance with the present invention.

FIG. 15 is a schematic of another method (different from the methods illustrated in FIG. 13 and FIG. 14) for associating a protective barrier with a cylindrical vessel or conduit in accordance with the present invention.

DETAILED DESCRIPTION OF THE INVENTION

Figure 3:
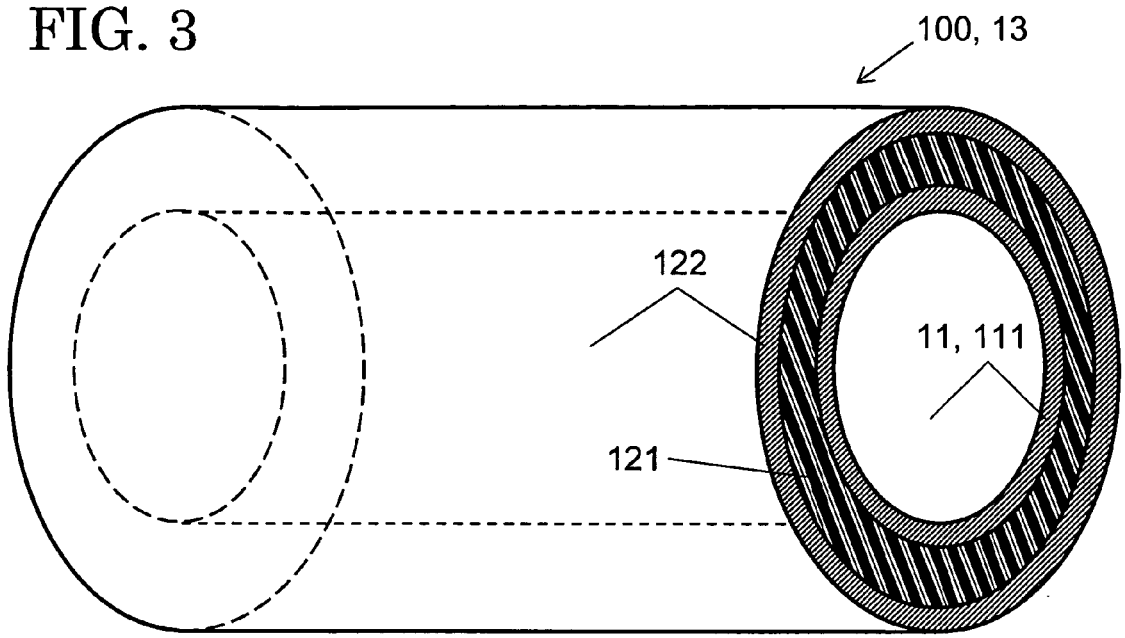
FIG. 3 is a perspective view of the inventive embodiment shown in FIG. 1.

Referring now to FIG. 1 through FIG. 3, a conventional pipe 11 having a cylindrical metal pipe wall 111 is covered with a cylindrical protective barrier 12 in accordance with the present invention. Protective barrier 12 includes an elastomeric layer 121 and a cylindrical metal sleeve 122, the elastomeric layer 121 being situated intermediate the pipe wall 111 and the sleeve 122. Elastomeric layer 121 is composed of a polymer (e.g., polyurea or polyurethane) characterized by high strain-rate sensitivity (strong strain-rate sensitivity). The present invention's combination 10, which includes the pipe 11 and the present invention's protective barrier 12, thus represents a laminar material system that includes three adjacent layers. In this multilayer system, a highly rate-sensitive elastomeric layer 121 is sandwiched between two "rigid" (i.e., more rigid than the elastomer of layer 121) layers, viz., pipe wall 111 and sleeve 122.

Figure 4:
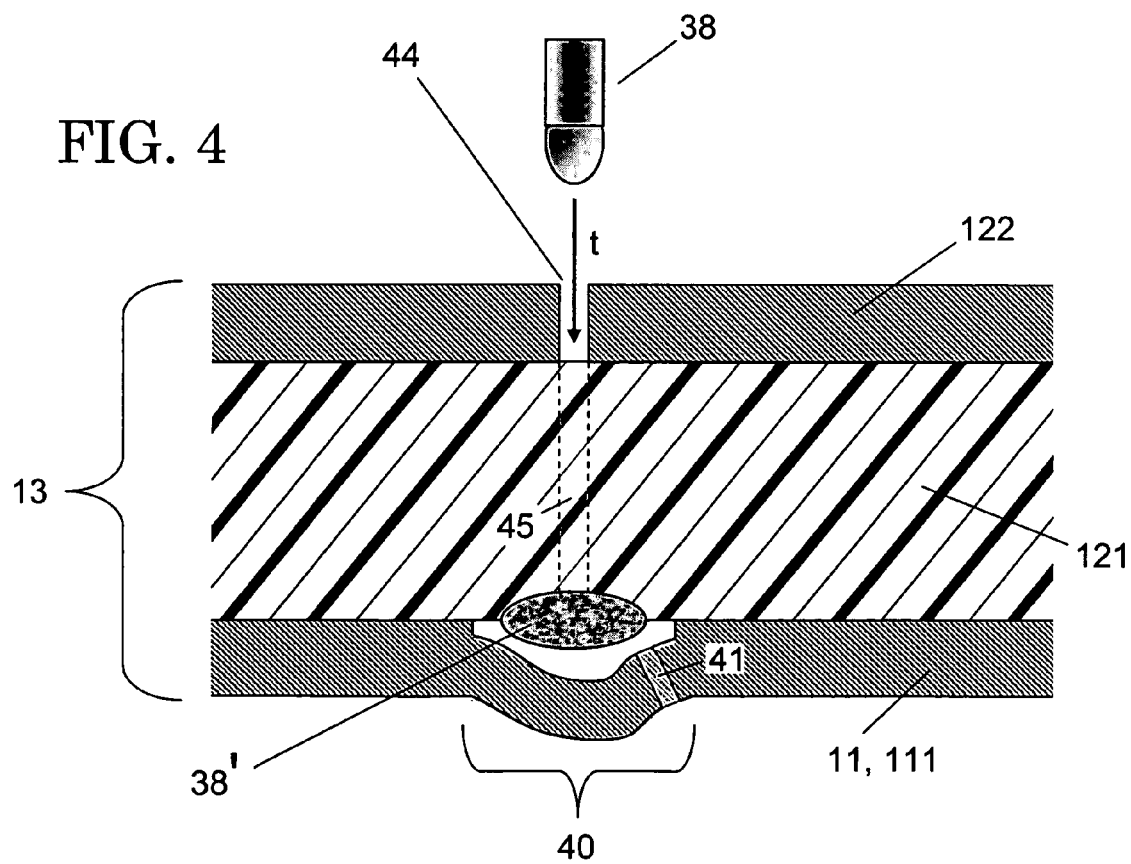
FIG. 4 is an axially-longitudinally cross-sectional view, partial and enlarged, of the inventive embodiment shown in FIG. 1, illustrating ballistic impact with respect to the inventive embodiment shown in FIG. 1.

Still referring to FIG. 1 through FIG. 3 and also referring to FIG. 4, inventive combination 10 represents a structure that affords effective resistance to penetration by kinetic rounds. This resistance to penetration, such as associated with ballistic attack, is important in protecting pipelines and a variety of other objects in which rupture can occur because of projectiles such as bullets or bomb fragments. The term "projectile" as used herein broadly refers to any body in motion that has been projected or impelled by force, typically continuing in motion by its own inertia, and typically a form of weaponry including but not limited to bullet, missile or bomb fragment. The structure shown in FIG. 4 corresponds to the portion of inventive three-layer material system 13 that is in the path of bullet 38, as shown in FIG. 1.

As illustrated in FIG. 4, metal sleeve 122 represents the strike face. A ballistic penetrator such as bullet 38 enters the metal sleeve 122 at location 44 and continues on bullet 38's trajectory t. Bullet 38 thereby produces a hole 45 along trajectory t in the outer layer (viz., metal sleeve 122) and middle layer (viz., elastomer 121) of the inventive three-layer system 13. The metal sleeve 122 acts in combination with the elastomeric layer 121 to blunt and/or fracture the bullet 38 through transient mechanical strength interactions. The elastomeric layer 121 also acts to slow down (reduce the speed of) bullet 38 by erosion and by absorption of heat energy. The portion of hole 45 that is contained in elastomeric layer 121 tends to "melt" back together in a narrowing manner. In a sense, the hole 45 portion in elastomeric layer 121 "heals" up so that elastomeric layer 121 layer reforms into a protective membrane, effectively constituting a seal against leakage. The blunted/broken bullet 38' then strikes the wall 111 of pipe 11.

As a result of being impacted by blunted/broken bullet 38', it may be the case that pipe wall 11 is deformed (such as manifested by a dent 40) but not ruptured (e.g., broken, torn or penetrated) by blunted/broken bullet 38'. As portrayed in FIG. 4, since blunted/broken bullet 38' has lost velocity and shape as compared with its former condition as bullet 38, it may be that blunted/broken bullet 38' can only form a dent 40 in pipe wall 111. In such case, the interaction between bullet 38 and, sequentially, the sleeve 122 and the elastomer 121, causes bullet 38 to fragment and blunt (thereby forming bullet 38') and decelerate; the pipe wall 11 is only dented, rather than being penetrated, by bullet 38'.

On the other hand, pipe wall 111 may be ruptured, e.g., compromised in such a way that one or more openings large enough to permit leakage therethrough are created at one or more locations therein. If pipe wall 11 is ruptured, such as depicted by rupture 41 in FIG. 4, the elastomeric layer 121 will expand and seal (or partially seal), thus limiting any leakage in or out. If pipe 111 is a conduit for a liquid or gaseous fluid, leakage out of pipe 111 thus being of greater concern, the polymeric seal represented by elastomeric layer 111 would tend to limit this leakage.

Figure 5:
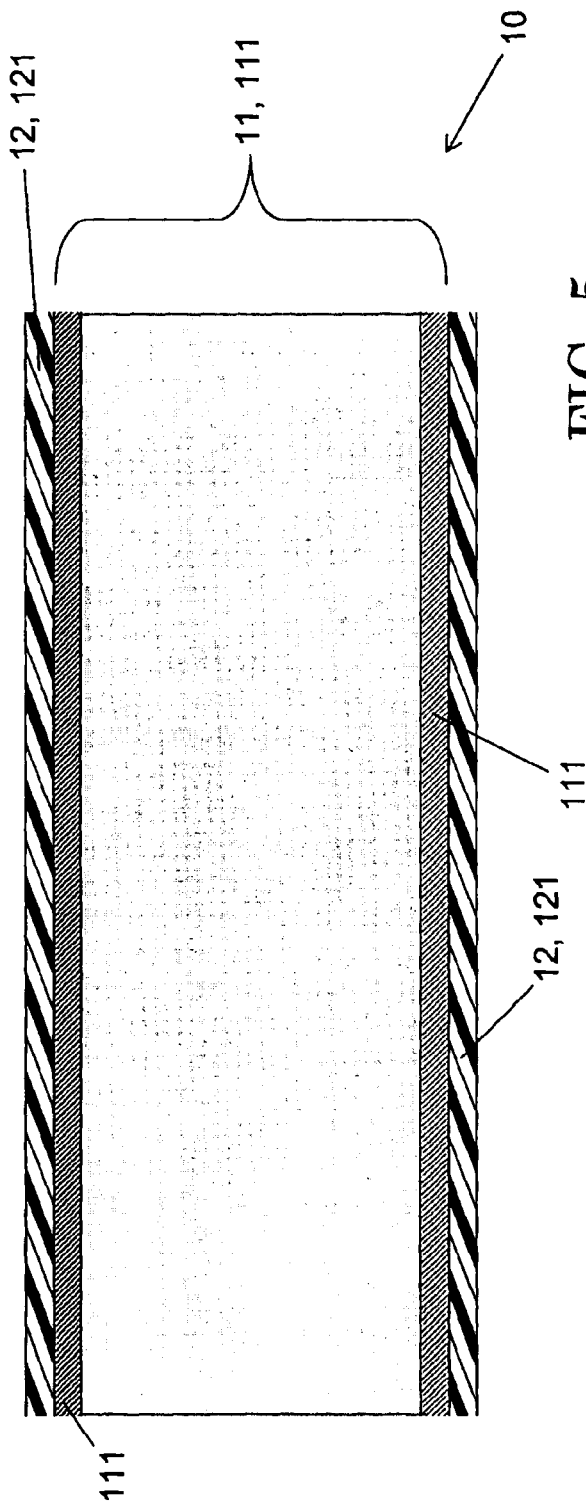
FIG. 5 is an axially-longitudinally cross-sectional view of an embodiment of a cylindrical two-layer material system in accordance with the present invention.
Figure 6:
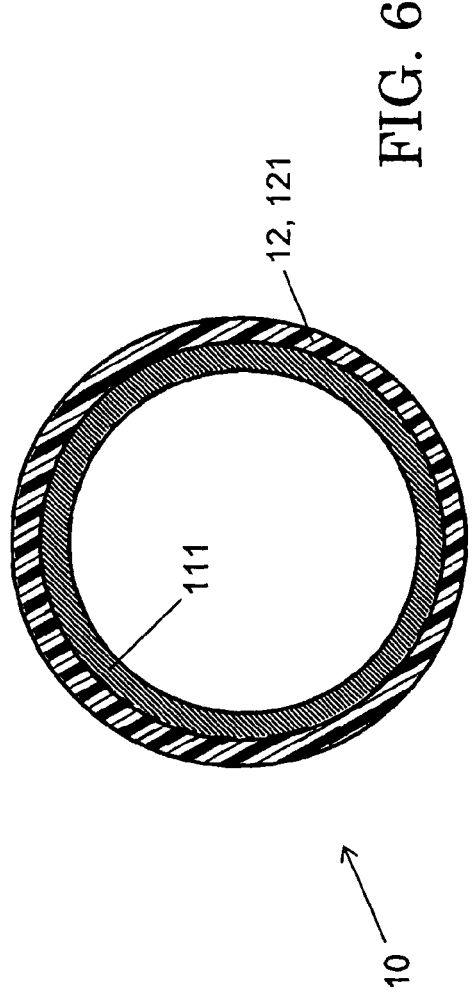
FIG. 6 is a diametrically-transversely cross-sectional view of the inventive embodiment shown in FIG. 5.

With reference to FIG. 5 and FIG. 6, cylindrical metal pipe wall 111 of pipe 11 is covered with a cylindrical protective barrier 12 that includes a highly rate-sensitive elastomeric layer 121 (such as shown in FIG. 1 through FIG. 3) but does not include a cylindrical metal sleeve 122. The elastomeric layer 121 can be applied to pipe wall 111 using a conventional technique such as involving casting or spraying of an uncured polymeric substance. The present invention's combination 10, which includes the pipe 11 and protective barrier 12 (which includes elastomeric layer 121), thus represents a laminar material system that includes two adjacent layers. In this two-layer material system, a highly rate-sensitive elastomeric layer 121 is placed on the outside surface of the innermost, "rigid" (i.e., more rigid than the elastomer of layer 121) layer, viz., pipe wall 111.

Figure 7:
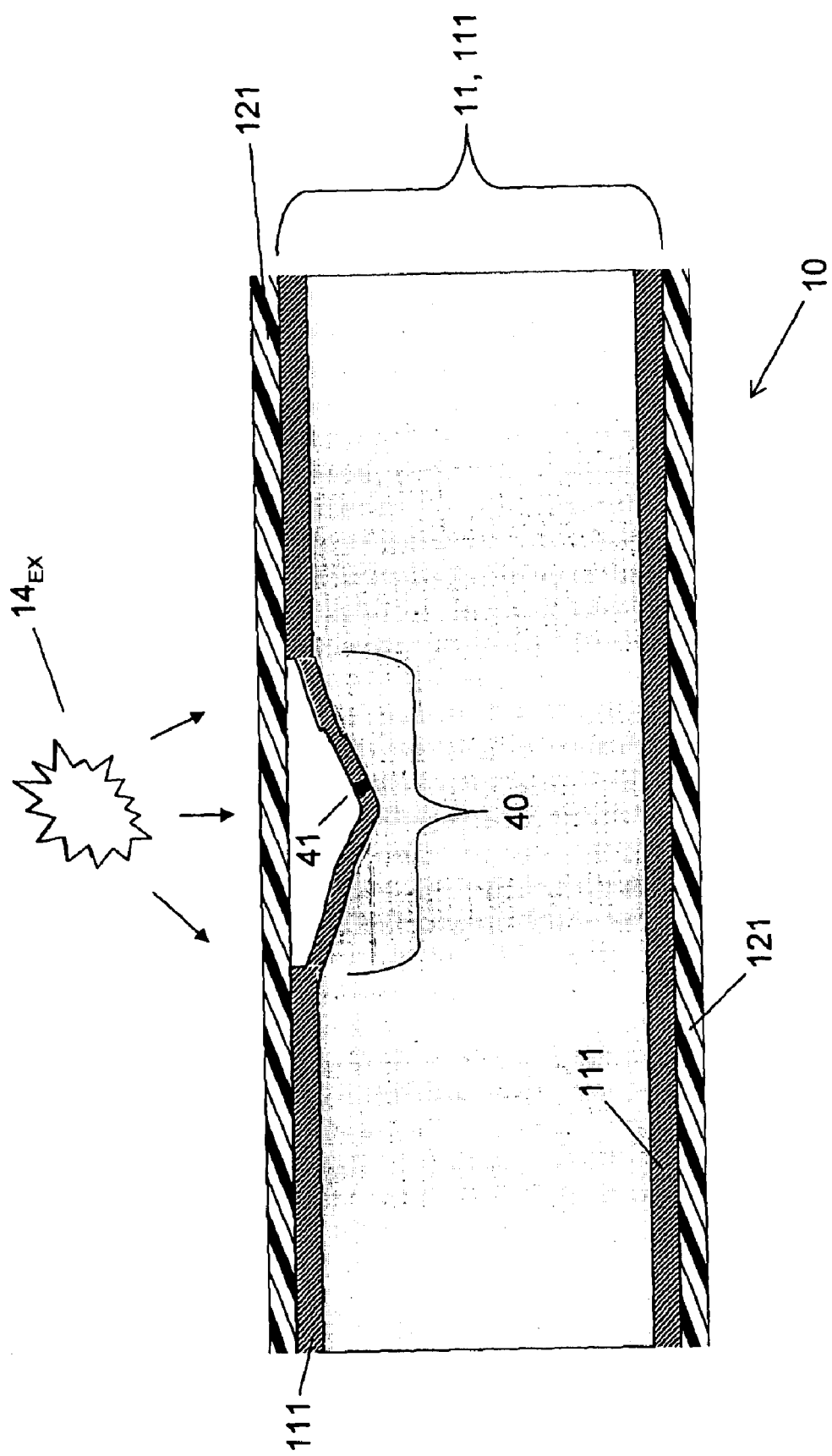
FIG. 7 is the view of FIG. 5, illustrating external explosive impact with respect to the inventive embodiment shown in FIG. 5.
Figure 8:
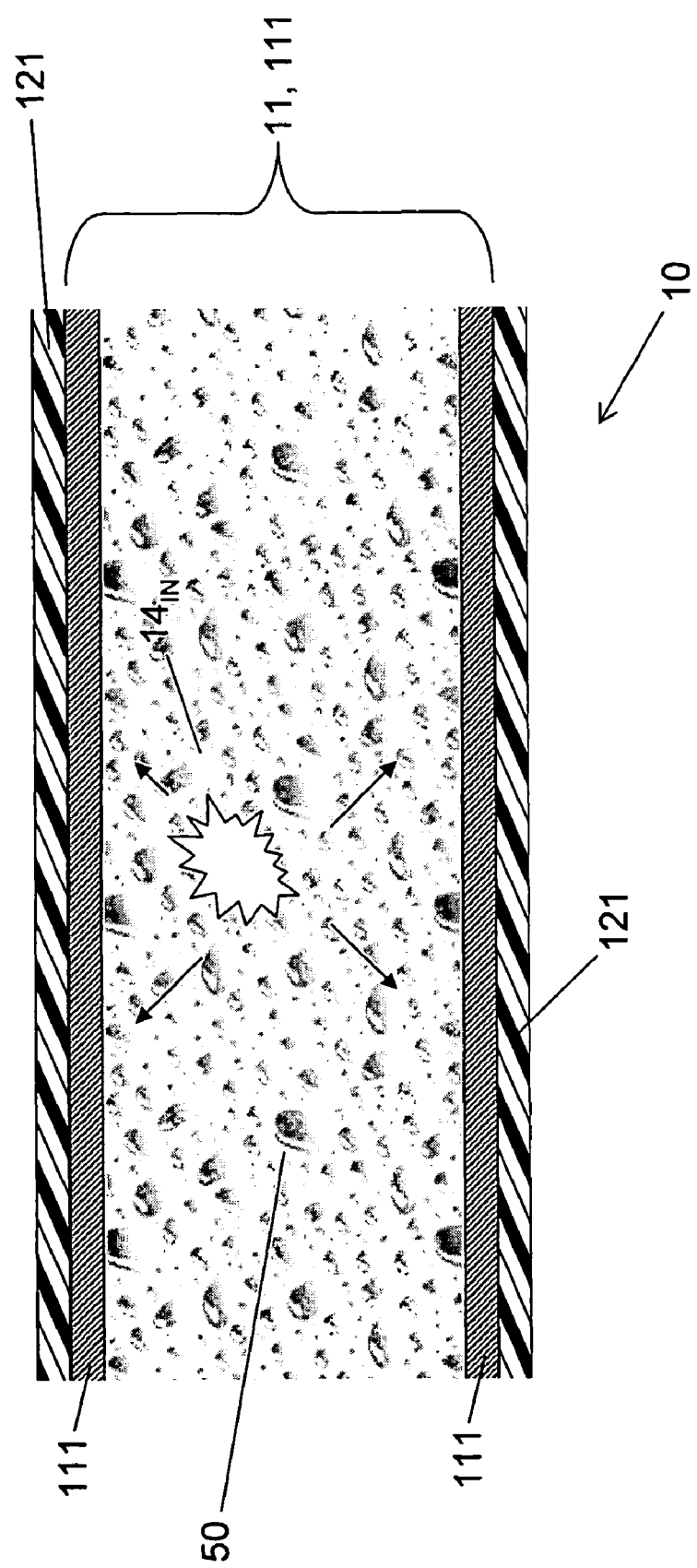
FIG. 8 is the view of FIG. 5, illustrating containment of a volatile or flammable liquid such as gasoline by the inventive embodiment shown in FIG. 5.
Figure 9:
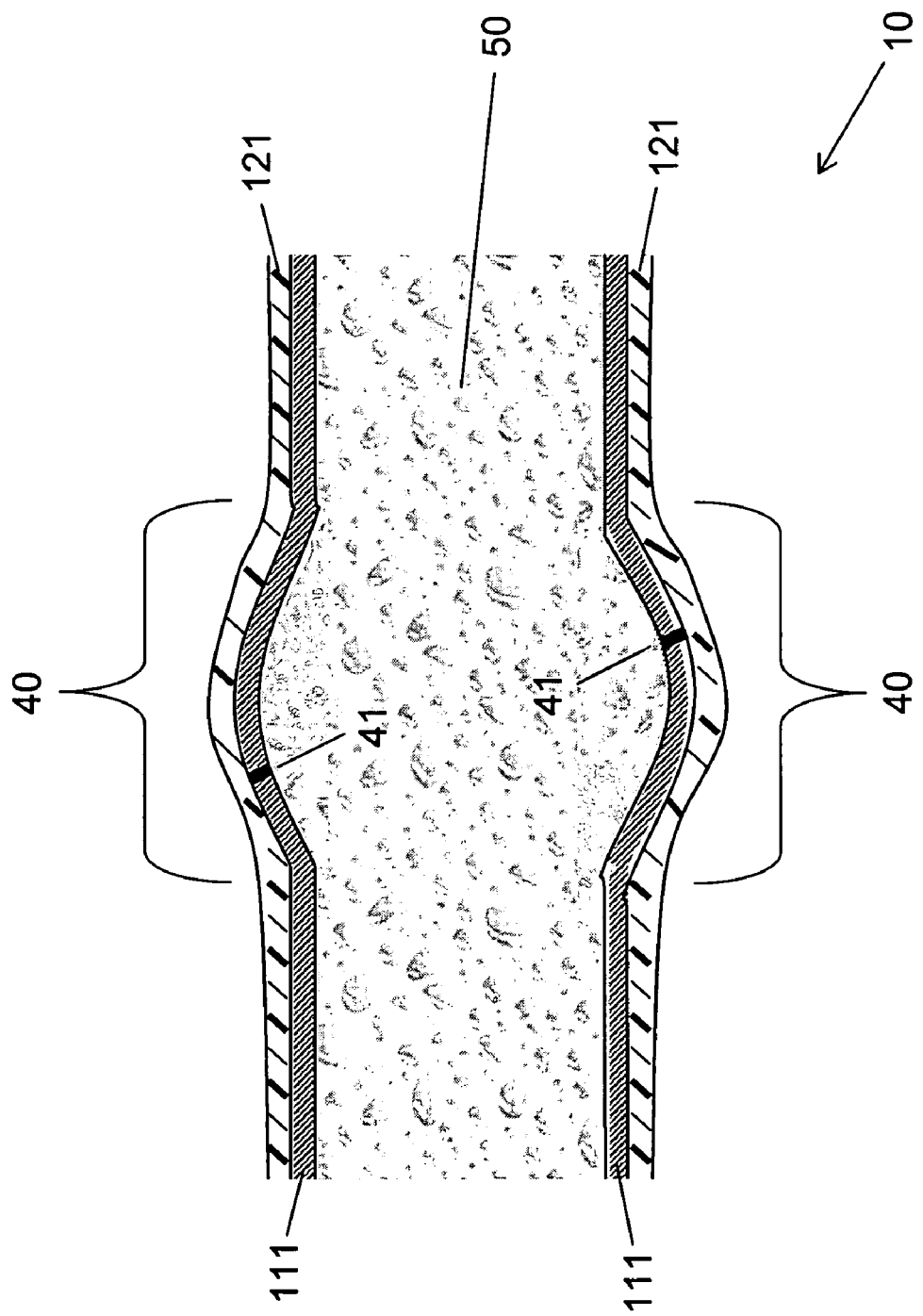
FIG. 9 is the view of FIG. 5, illustrating internal explosive impact with respect to the inventive embodiment shown in FIG. 8.

FIG. 5 and FIG. 6 portray an inventive combination 10 prior to an impacting event. Reference now being made to FIG. 7 through FIG. 9, an external or internal explosion might take place with respect to an inventive combination 10 such as depicted in FIG. 5 and FIG. 6. The elastomeric layer 121, placed on the outside surface of pipe wall 111, can serve to lend protection with respect to either an external explosive event $14_{EX}$ (such as shown in FIG. 7) or an internal explosive event $14_{IN}$ (such as shown in FIG. 8 and FIG. 9).

As illustrated in FIG. 7, elastomeric layer 121 affords a degree of protection while facing an explosive pulse $14_{EX}$, which can be conceived in this illustration to be either an underwater detonation/burst or a surface detonation/burst. The behavior of the inventive combination 10 would be similar whether submerged or non-submerged. The inventive combination 10 is characterized by a great elongation capacity after damaging loading has occurred. This elongation capacity is significantly greater than that which would characterize the pipe wall 111 in the absence of the elastomeric layer 121. Upon occurrence of the external explosion $14_{EX}$, elastomeric layer 121 becomes a residual membrane covering over the underlying deformation area 40 in pipe wall 111, which includes denting and/or fracturing and/or rupturing such as represented by rupture 41 in pipe wall 111. Thus, subsequent to the external explosion $14_{EX}$, the elastomer 121 membrane itself remains intact or is only slightly ruptured (e.g., torn). If pipe 11 is submerged in water or other liquid, the elastomer 121 membrane either entirely prevents liquid from entering pipe 111 or substantially prevents liquid from entering pipe 111 (e.g., permitting the liquid to enter pipe 111 at a slow and manageable rate).

As illustrated in FIG. 8 and FIG. 9, internal explosion $14_{IN}$ occurs within a liquid-filled (e.g., gasoline-filled) pipe 11, which can be conceived to be either in or out of water. Relative to internal explosion $14_{IN}$, elastomeric layer 121 is situated on the opposite face of the pipe wall 111. When ruptures 41 occur to the underlying wall 111 of the pipe 11, elastomeric layer 121 provides a membrane over the damaged areas 40, thereby reducing the potential for leakage out of the pipe 11. Thus, subsequent to the internal explosion $14_{IN}$, the elastomer 121 membrane itself remains intact or is only slightly ruptured (e.g., torn). If pipe 11 contains liquid or gaseous fluid 50, the elastomer 121 membrane either entirely prevents the fluid from exiting pipe 111 or substantially prevents the fluid 50 from exiting pipe 111 (e.g., permitting fluid 50 to exit pipe 111 at a slow and manageable rate).

As usually practiced, the present invention's protective barrier 12 includes at least one elastomeric material layer (such as that which is applied through molding, casting, spraying or bonding) and at least one structural material layer (made of a metal or composite or other non-metal material). In the context of inventive practice, the terms "structural layer," "structural material layer," "rigid layer" and "stiff layer" are used synonymously herein to refer to a layer that is characterized by a degree of rigidity (or stiffness) so as to be more rigid (or stiff) than an elastomeric layer. Generally speaking, the "structural" character of a material, e.g., in terms of its load-bearing capability, directly relates to its rigidity (or stiffness); hence, an inventive "structural layer" is not only more rigid (or stiff) but is also more "structural" than is an inventive elastomeric layer. The present invention's structural material is typically a non-elastomeric material, but can be elastomeric (e.g., a fiber-reinforced elastomeric matrix composite material) in some inventive embodiments. The present invention's highly strain-rate-sensitive elastomeric layer has the quality of reacting instantaneously to impact (for instance, at strain rates in the $10^3$/sec-$10^6$/sec range) so as to temporarily become significantly more rigid than it is in its normal (non-impacted) state, and of then returning to its normal elastic (e.g., viscoelastic) state shortly after absorbing energy associated with the impact.

The elastomeric material of which the present invention's elastomeric layer 121 is composed is typically characterized by a Young's modulus in the range between approximately 700 psi and approximately 1000 psi, at 100% strain. Moreover, the present invention's elastomeric material is typically characterized by strong strain-rate-sensitivity in the strain-rate range between approximately 1,000/second and approximately 1,000,000/second, especially or more typically in the strain-rate range between approximately 10,000/second and approximately 1,000,000/second. Some polyurethanes, some polyureas, and some other polymeric materials meet these criteria. Three commercially available polyureas meeting these criteria, and some of their characteristics, are set forth in FIG. 12. Plasite Protective Coatings, Inc. of Maple Shade, N.J., manufacturer of Semstone 403, is now owned by Carboline Company of St. Louis Mo., a subsidiary of RPM of Medina, Ohio. Air Products and Chemicals, Inc. of Allentown, Pa., manufactures Versalink® P-1000 oligomeric diamine (polytetramethyleneeoxide-di-p-aminobenzoate). Polyshield HI-E™ is manufactured by Specialty Products Inc. (SPI) of Lakewood, Wash. These are but three examples among the many commercially available formulations, polymeric and otherwise, that may be strain-rate-sensitive elastomeric materials suitable for inventive practice.

Generally, elastomers meeting the above-said criteria (Young's modulus in the range of approximately 700-1000 psi at 100% strain; strain-rate-sensitivity hardening in the range of approximately $10^3$/second-$10^6$/second) will also have the following characteristics in low rate-of-loading conditions: Young's modulus in the range between approximately 1200 psi and 1400 psi, at 300% strain; Young's modulus in the range between approximately 4000 psi and approximately 6000 psi, at 400% strain; elongation in the range between approximately 200% and approximately 800%, typically more than approximately 400%; tensile strength in the range between approximately 2000 psi and approximately 8000 psi; Poison's ratio in the range between approximately 0.45 and approximately 0.49 (as close to 0.5 as possible, which represents incompressibility of the elastomer).

Because of its high rate-sensitivity, a typical elastomer used in inventive practice is characterized by a Young's modulus that increases at high rate loading (e.g., rate loading in the range between approximately 5000/sec and approximately 6000/sec) from approximately 400 psi to: the range between approximately 20,000 psi and approximately 30,000 psi, under unconfined conditions; the range between approximately 500,000 psi and approximately 600,000 psi, under confined conditions. The terms "elastomer" and "elastomeric material," as used herein, broadly refer to any material having elastic (e.g., viscoelastic) physical character, regardless of whether it includes at least one structural material (e.g., a plasticizer or an antioxidant) that is incorporated therein for at least one enhancement purpose.

The present invention can be practiced in multifarious laminar configurations in which the laminar configuration is inclusive of (i) one or practically any plural number of strain-rate sensitive elastomeric layers and (ii) one or practically any plural number of structural (stiff) layers. For instance, with reference to FIG. 10 and FIG. 11, a an inventive combination 1000 includes all that inventive combination 1000 includes (i.e., structural pipe wall 111, elastomeric layer 121a, and structural sleeve 122) plus an additional elastomeric layer 121, viz., elastomeric layer 122b. This four-layer material system thus includes: a rigid, innermost layer (pipe wall 111); an elastomeric, second-innermost layer (elastomeric layer 121a); a rigid, second-outermost layer (sleeve 122); and, an elastomeric, outermost layer (elastomeric layer 121b). The cylindrical protective barrier 12 shown in FIG. 11 and FIG. 12 thus includes, in alternate arrangement, an elastomeric layer 121a, a rigid layer 122, and an elastomeric layer 121b. The mechanism for protection from a projectile is similar to that for the inventive combination 100 shown in FIG. 1 through FIG. 3, except that inventive combination 1000 provides an extra measure of protection; that is, elastomeric layer 122b, placed on the sleeve 122 surface, serves to, further blunt and/or fragment and/or reduce the speed of a penetrator such as bullet 38 shown in FIG. 4.

In the light of the instant disclosure, the ordinarily skilled artisan will appreciate the various ways in which an inventive protective barrier 12 can be applied to an existing structure such as a conventional pipe 11. For instance, again with reference to FIG. 1 through FIG. 3 and also with reference to FIG. 13 through FIG. 15, there are various methods for associating the inventive protective barrier 12 shown in FIG. 1 through FIG. 3 with a pipe 11 (or other object) sought to be protected from ballistic or explosive impact. The end result of the distinguishable application methods shown in FIG. 13 through FIG. 15 is essentially the same, viz., an inventive combination 100 in which a rigid (e.g., metal) sleeve 122 is disposed around a rigid (e.g., metal) pipe wall 111 and in which strain-rate-sensitive elastomer 121 disposed between sleeve 122 and pipe wall 111.

FIG. 13 illustrates a practical approach to coupling an inventive protective barrier 12 with a pipe 11. The metal sleeve 122 is placed around pipe wall 111, thus positioned so as to coaxially/concentrically encircle pipe wall 11 and leave an empty space 80 therebetween. The space 80 between sleeve 122 and pipe wall 111 is subsequently filled (e.g., via injection molding) with a highly rate-sensitive elastomer (in an uncured state), which is then permitted to cure for a suitable period, e.g., at least 24 hours, thereby forming elastomeric layer 121.

Figure 14:
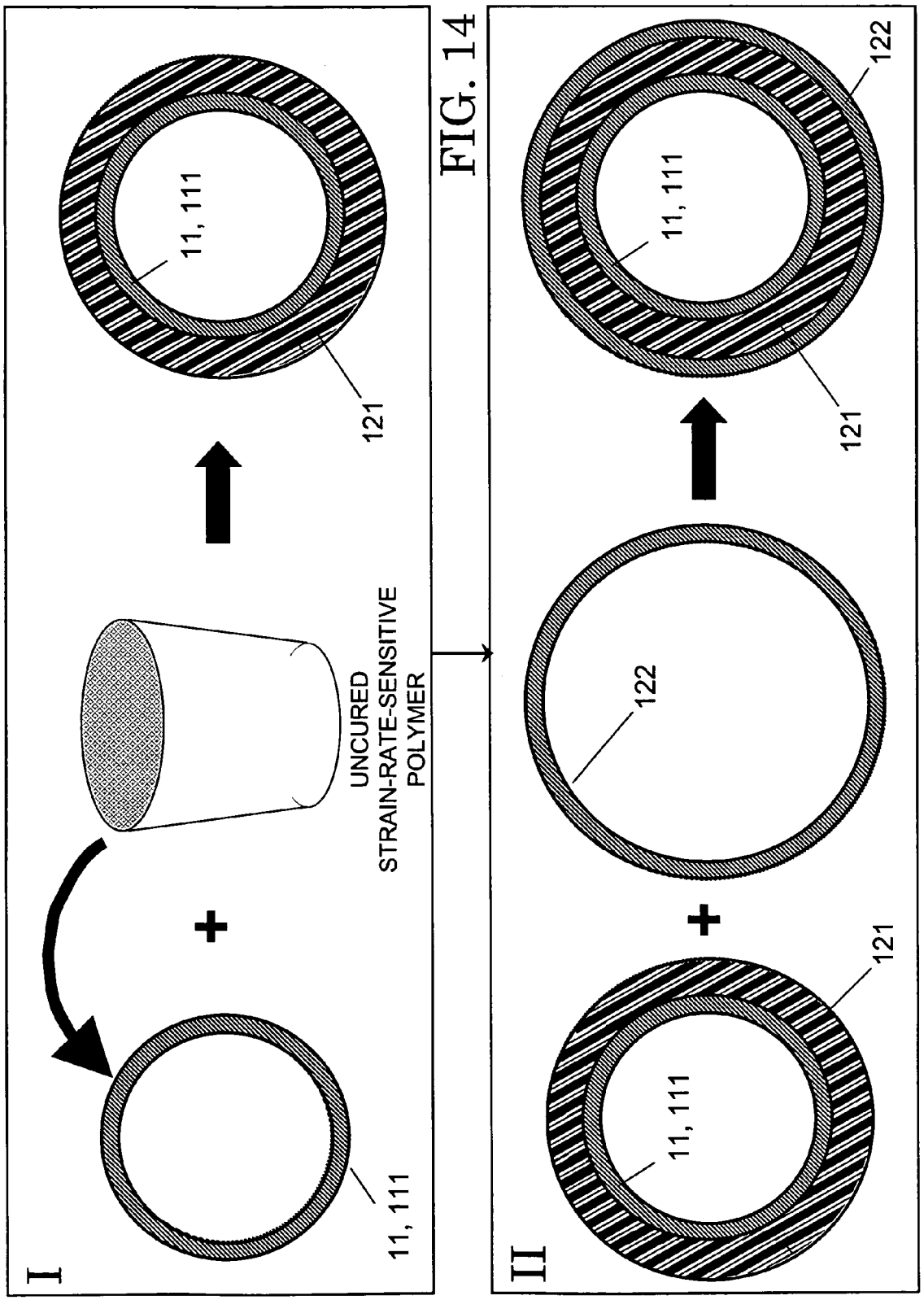
FIG. 14 is a schematic of another method (different from the method illustrated in FIG. 13) for associating a protective barrier with a cylindrical vessel or conduit in accordance with the present invention.

According to the alternative approach illustrated in FIG. 14, highly rate-sensitive elastomer (in an uncured state) is sprayed or cast onto the outside surface of pipe wall 111 and is then permitted to cure for a suitable period, e.g., at least 24 hours. When the elastomeric material is completely cured, thereby forming elastomeric layer 121, the sleeve 122 is placed around (positioned so as to circumscribe, but not too tightly) the elastomeric layer 121, which coats/covers the outside surface of the pipe wall 111. The approach shown in FIG. 15 is similar to that shown in FIG. 14, except that the highly rate-sensitive elastomer (in an uncured state) is sprayed or cast onto the inside surface of sleeve 122, rather than onto the outside surface of pipe wall 111. The applied elastomer is permitted to cure upon the inside surface of sleeve 122 for a suitable period, e.g., at least 24 hours. When the elastomeric material is completely cured, thereby forming elastomeric layer 121, the combination article that includes the elastomer 121 (on the inside of the combination article) and the sleeve 122 (on the outside of the combination article) is placed around (positioned so as to circumscribe, but not too tightly) the outside surface of the pipe wall 111.

More generally, inventive practice can provide for the application of at least one elastomeric layer through molding, casting, spraying or bonding. Regardless of the inventive fabrication technique, inventive practice usually prefers the contiguous arrangement of the three layers. In the example shown in FIG. 1 through FIG. 3, for instance, the three cylindrical layers—namely pipe wall 111, elastomer 121 and sleeve 122—are contiguously and circumscriptively configured. The metal sleeve 122 is the outermost layer of the inventive three-layer material system 13. The metal sleeve 122 is the innermost layer of the inventive three-layer system 12. The elastomeric layer 121 (which overlies the metal pipe wall 111 and underlies the metal sleeve 122) is the intermediate layer of the inventive three-layer system 13. Thus, for instance, if the inventive combination 10 is made so as to dispose sleeve 122 around a completely cured elastomeric layer 121 (with which pipe wall 111 has been coated/covered), the elastomer 121 should fit inside the sleeve 122 so that the latter lightly hugs (without exerting undue pressure upon) the former.

The present invention, which is disclosed herein, is not to be limited by the embodiments described or illustrated herein, which are given by way of example and not of limitation. Other embodiments of the present invention will be apparent to those skilled in the art from a consideration of the instant disclosure or from practice of the present invention. Various omissions, modifications and changes to the principles disclosed herein may be made by one skilled in the art without departing from the true scope and spirit of the present invention, which is indicated by the following claims.

What is claimed is:

1. A laminar composite structure comprising three adjacent layers, said three adjacent layers being a structural first layer, a highly strain-rate-sensitive elastomeric second layer and a structural third layer, said highly strain-rate-sensitive elastomeric second layer confined between said structural first layer and said structural third layer, said highly strain-rate-sensitive elastomeric second layer made of an elastomer selected from the group consisting of polyurethane, polyurea and a mixture thereof and characterized by a Young's modulus in the range of approximately 700-1000 psi at 100% strain, said highly strain-rate-sensitive elastomeric intermediate layer further characterized by high strain-rate-sensitivity hardening in the strain rate range of approximately $10^3$/second-$10^6$/second in association with a ballistic and/or explosive event.

2. The laminar composite structure of claim 1, wherein said structural first layer and said structural third layer each at least substantially consist of a material selected from the group consisting of metal, fiber-reinforced matrix composite and ceramic.

3. The laminar composite structure of claim 1, said laminar composite structure being characterized by resistance with respect to impact by a projectile that penetrates said structural first layer, wherein said projectile is mitigated upon traversing said structural first layer and said highly strain-rate-sensitive elastomeric second layer, and wherein said structural third layer is deformed but remains at least substantially intact upon impact by said projectile.

4. The laminar composite structure of claim 3, wherein said mitigation of said projectile includes at least one of blunting, breakage and slowing of said projectile, and wherein said deformation of said structural third layer includes at least one of denting and breakage of said structural third layer.

5. The laminar composite structure of claim 4, wherein:
said laminar composite structure further comprises a fluid contained by said structural third layer;
said highly strain-rate-sensitive elastomeric second layer stiffens upon being traversed by said projectile;
said highly strain-rate-sensitive elastomeric second layer subsequently elasticizes so as to form a membrane that at least substantially covers said deformation of said structural third layer;
said deformation of said structural third layer includes breakage;
said membrane reduces leakage of said fluid from said laminar composite structure.

6. The laminar composite structure of claim 5, wherein said laminar composite structure is tubular.

7. The laminar composite structure of claim 4, wherein said highly strain-rate-sensitive elastomeric intermediate layer stiffens upon being traversed by said projectile, and wherein said highly strain-rate-sensitive elastomeric intermediate layer is characterized by a de-perforatively self-restorative quality whereby, if said highly strain-rate-sensitive elastomeric intermediate layer is perforated upon being traversed by said projectile, then immediately following said traversal said highly strain-rate-sensitive elastomeric second layer elastically expands so as to at least substantially restore continuity to itself at the site of said perforation, said highly strain-rate-sensitive elastomeric second layer thereby forming a membrane that is at least substantially coextensive with said deformation of said structural third layer.

8. The laminar composite structure of claim 1, wherein said highly strain-rate-sensitive elastomeric second layer at least substantially consists of polyurea.

9. The laminar composite structure of claim 1, wherein said highly strain-rate-sensitive elastomeric second layer at least substantially consists of a mixture of polyurea and polyurethane.

10. A tubular composite article for use in association with a tubular body, said tubular body having an outside surface and being characterized by rigidity, said tubular composite article comprising an outer layer and an inner layer, wherein:
said outer layer is characterized by rigidity;
said inner layer comprising a high strain-rate-sensitive elastomer selected from the group consisting of polyurethane, polyurea and a mixture thereof and characterized by elasticity, a Young's modulus in the range of approximately 700-1000 psi at 100% strain, and high strain-rate-sensitivity hardening in the strain-rate range of approximately $10^3$/second-$10^6$/second in association with a ballistic and/or explosive event;
said tubular composite article is capable of attachment so as to contiguously circumscribe the outside surface of said tubular body and confine the high strain-rate-sensitive elastomer so as to alleviate damage to said tubular structure that ensues from the impact of a projectile;
the alleviation by said tubular composite article of said damage includes the moderation of said projectile, both structurally and kinetically, by said tubular composite article prior to said projectile reaching said tubular structure.

11. The tubular composite article of claim 10, wherein:
said tubular body contains a fluid;
said inner layer tends toward a rigid state when absorbing energy from said projectile;
said inner layer tends toward an elastic state after absorbing energy from said projectile;
the alleviation by said tubular composite article of said damage includes, after said absorption of energy by said inner layer, the effective formation by said inner layer of a protective membrane over said tubular body, said protective membrane attenuating leakage of said fluid from said tubular body.

12. The tubular composite article of claim 10, wherein said outer layer and said tubular body each at least substantially consist of a material selected from the group consisting of metal, fiber-reinforced matrix composite and ceramic.

13. The tubular composite article of claim 10, wherein said inner layer at least substantially consists of polyurea.

14. The tubular composite article of claim 10, wherein said inner layer at least substantially consists of a mixture of polyurea and polyurethane.

15. The tubular composite article of claim 10, wherein said inner layer stiffens upon being traversed by said projectile, and wherein said inner layer is characterized by a de-perforatively self-restorative quality whereby, if said inner layer is perforated upon being traversed by said projectile, then immediately following said traversal said highly strain-rate-sensitive elastomeric second layer elastically expands so as to at least substantially restore continuity to itself at the site of said perforation, said highly strain-rate-sensitive elastomeric second layer thereby forming a membrane that is at least substantially coextensive with said damage to said tubular structure.

16. A method for attributing a hollow object with a protective barrier, said hollow object including a rigid wall, said method comprising:

placing a rigid sleeve around said hollow object so as to leave a space between said sleeve and said rigid wall;

substantially filling said space with a highly strain-rate-sensitive elastomer and as a result confining said highly strain-rate-sensitive elastomer, said highly strain-rate-sensitive elastomer selected from the consisting of polyurethane, polyurea and a mixture thereof and characterized by a Young's modulus in the range of approximately 700-1000 psi at 100% strain, said highly strain-rate-sensitive elastomer further characterized by high strain-rate-sensitivity hardening in the strain-rate range of approximately $10^3$/second-$10^6$/second in association with a ballistic and/or explosive event.

17. The method of claim 16, wherein performance of said placing and said substantially filling results in a laminar composite structure that includes three adjacent layers, said three adjacent layers being a structural outside layer, an elastomeric intermediate layer and a structural inside layer, said structural outside layer being constituted by said rigid sleeve, said elastomeric intermediate layer being constituted by said highly strain-rate-sensitive elastomer in a cured state, said structural inside layer being constituted by said rigid wall.

18. The method of claim 16, wherein said rigid sleeve and said rigid wall are each made of a material selected from the group consisting of metal, fiber-reinforced matrix composite and ceramic.

19. The method of claim 16, wherein said strain-rate-sensitive elastomer comprises polyurea.

20. The method of claim 16, wherein said at least substantially filling said space includes confining said strain-rate-sensitive elastomer between said sleeve and said rigid wall so that said highly strain-rate-sensitive elastomer is characterized by a Young's modulus increasing to at least approximately 500,000 psi in the strain-rate range of approximately $10^3$/second-$10^6$/second in association with a ballistic and/or explosive event.

* * * * *